Sept. 11, 1962 C. J. MANTHEY 3,053,128
SHEET CUTTING AND DELIVERY UNITS
Filed July 11, 1957 4 Sheets-Sheet 1

INVENTOR
CARLETON J. MANTHEY
BY
*Alfred W. Petchaft*
ATTORNEY

INVENTOR
CARLETON J. MANTHEY
BY
ATTORNEY

Sept. 11, 1962   C. J. MANTHEY   3,053,128
SHEET CUTTING AND DELIVERY UNITS
Filed July 11, 1957   4 Sheets-Sheet 4

INVENTOR
CARLETON J. MANTHEY
BY
ATTORNEY

United States Patent Office 3,053,128
Patented Sept. 11, 1962

3,053,128
SHEET CUTTING AND DELIVERY UNITS
Carleton J. Manthey, Cool Valley, Mo., assignor to Central States Paper & Bag Co., St. Louis, Mo., a corporation of Missouri
Filed July 11, 1957, Ser. No. 671,355
11 Claims. (Cl. 83—110)

This invention relates to an apparatus for handling sheet material and, more particularly, to machinery for cutting predetermined sizes of plastic sheets from a supply roll and conveying the sheet thus cut.

In various manufacturing processes and packaging operations, it is convenient, or often essential, to wrap objects in large sheets of wrapping material, which is available in rolls, stacks, or bundles, and, for some reason, the wrapping operation must be handled manually rather than by automatic packaging machinery. The fire clay industry is an example of such industrial packaging problem. Fire clay, for instance, is sold in plastic condition so that it may be trowled or otherwise worked "on the job," so to speak. Hence, the fire clay, after being mixed and plasticized, is passed through an extruding unit to form blocks which are successively discharged from the extruding unit onto a delivery conveyor. In this condition, the blocks of fire clay contain a high percentage of moisture and, in order to maintain the moisture content of the blocks, the blocks are usually wrapped in polyethylene or other similar moisture impervious sheet material. Since the clay blocks are rather fragile, this must be done manually and, therefore, as the clay blocks travel along the delivery conveyor, the workmen pick up a large polyethylene sheet from a nearby stack of sheets and manually wrap each of the blocks. However, polyethylene and similar sheet materials are frequently difficult to pick up one at a time from a stack and this results in a slowing up of the clay block packaging operation. Furthermore, the size of the blocks is often changed at the end of each production run, necessitating an available supply of several stacks of sheets of varying sizes.

It is, therefore, one of the objects of the present invention to provide an apparatus for successively cutting plastic sheets from a continuous web withdrawn from a supply roll, and transferring the sheets thus cut along a conveyor for subsequent use as wrapping material.

It is also an object of the present invention to provide an apparatus of the type stated which permits rapid cutting and conveying of the sheets as the need arises.

It is a further object of the present invention to provide an apparatus of the type stated which readily permits adjustment of the size of sheets cut and conveyed.

With the above and other objects in view, my invention resides in the novel features of form, construction, arrangement, and combination of parts presently described and pointed out in the claims.

Figure 1:
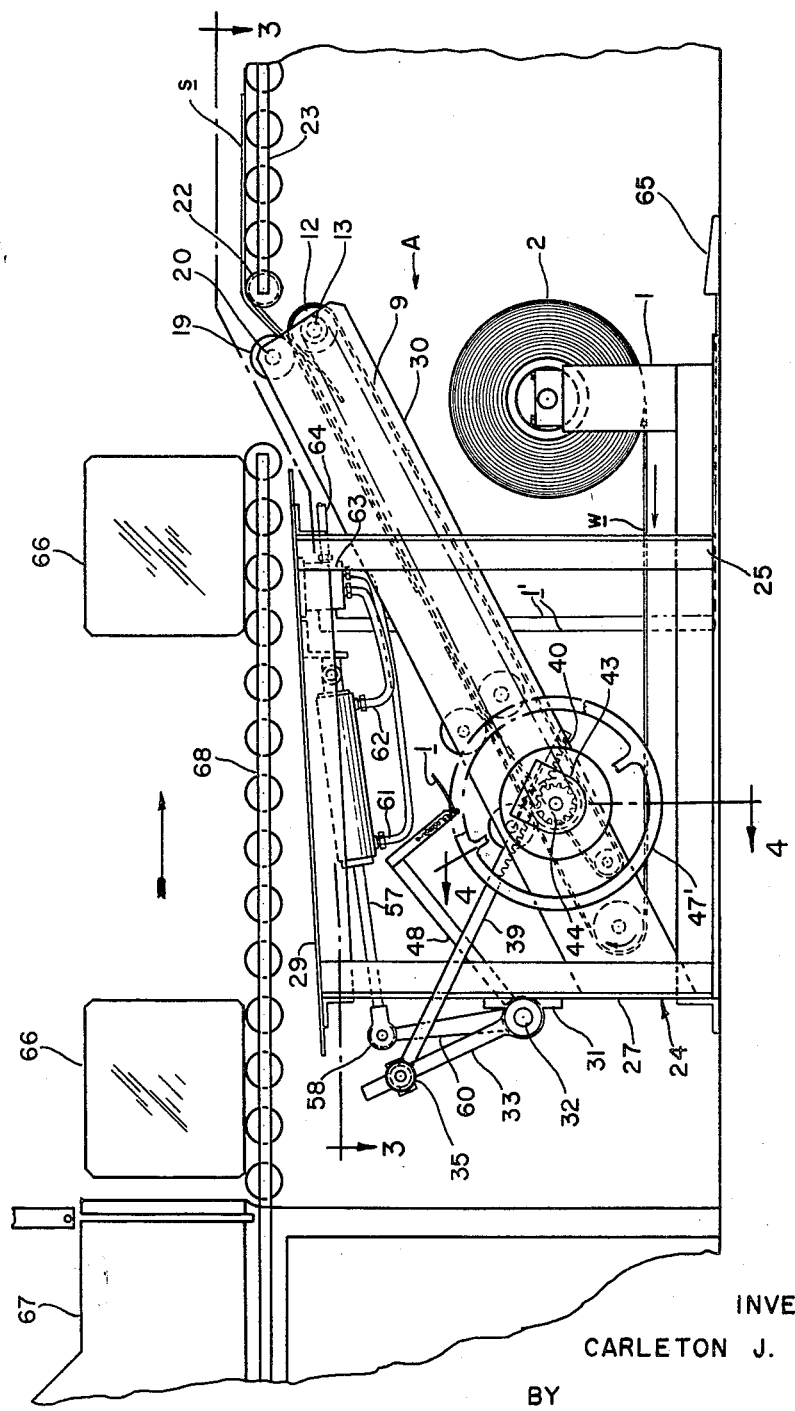
FIG. 1 is a side elevational view of an apparatus for cutting and delivering sheets constructed in accordance with and embodying the present invention.
Figure 2:
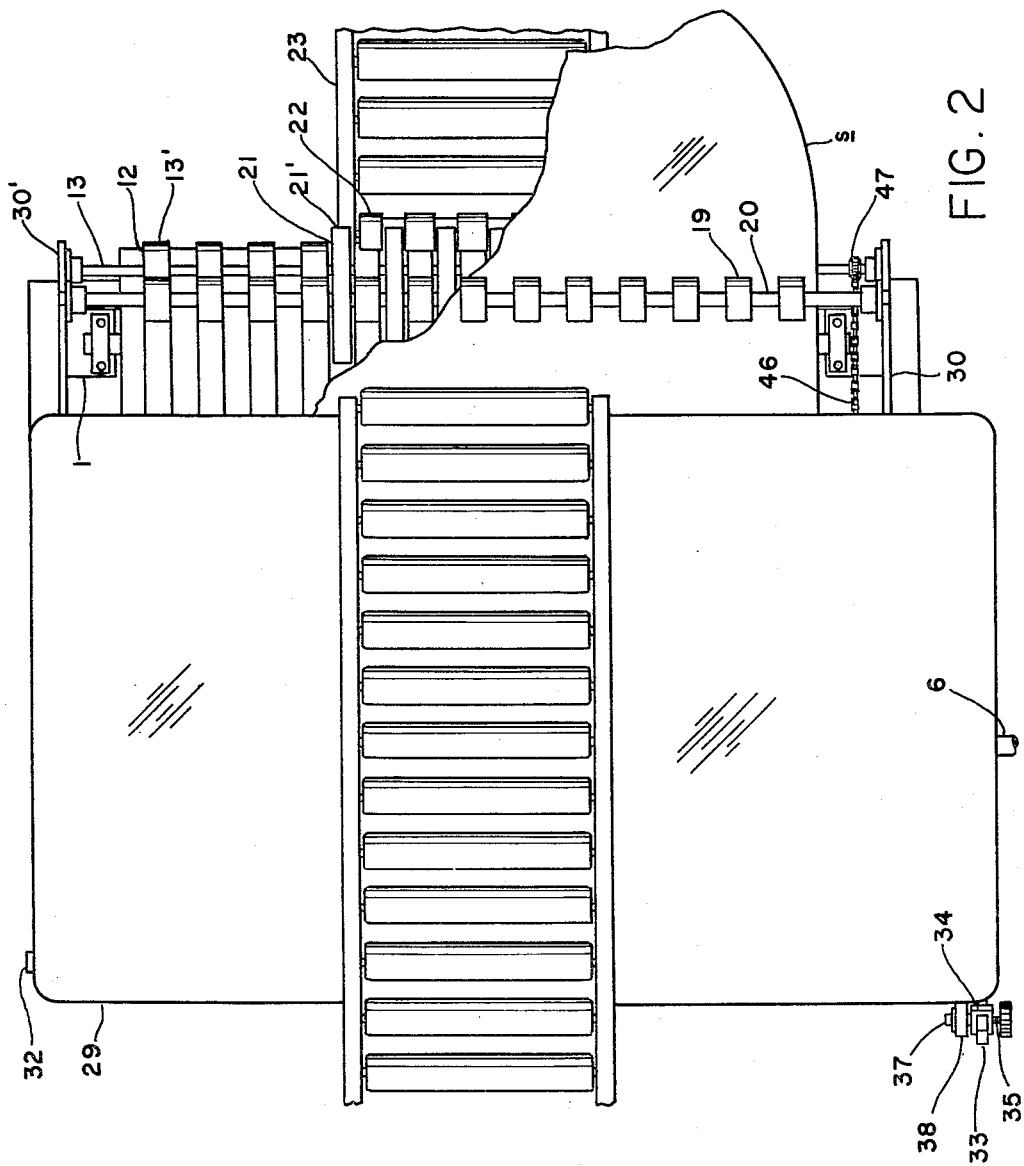
FIG. 2 is a top plan view of the apparatus.
Figure 3:
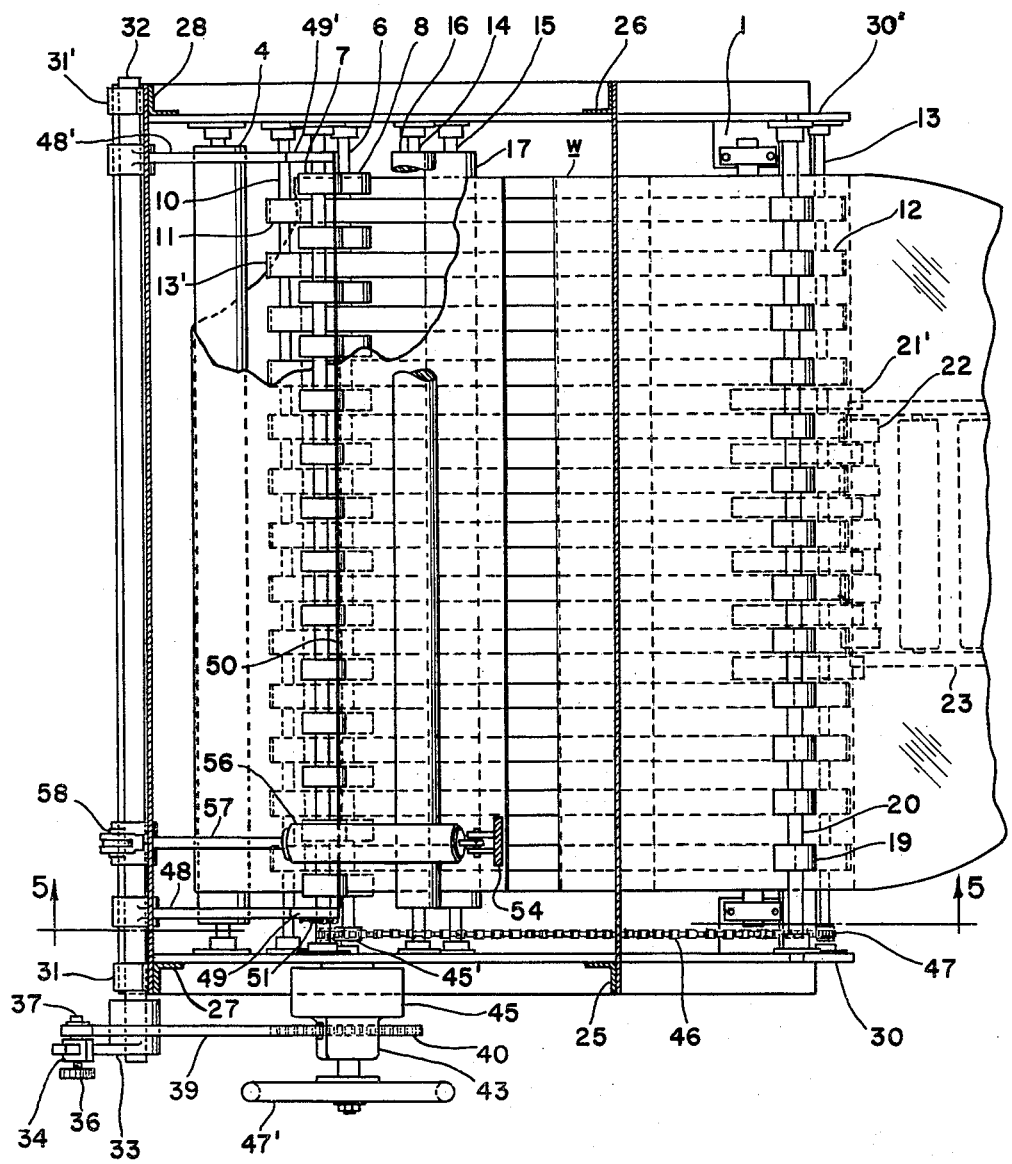
Figure 4:
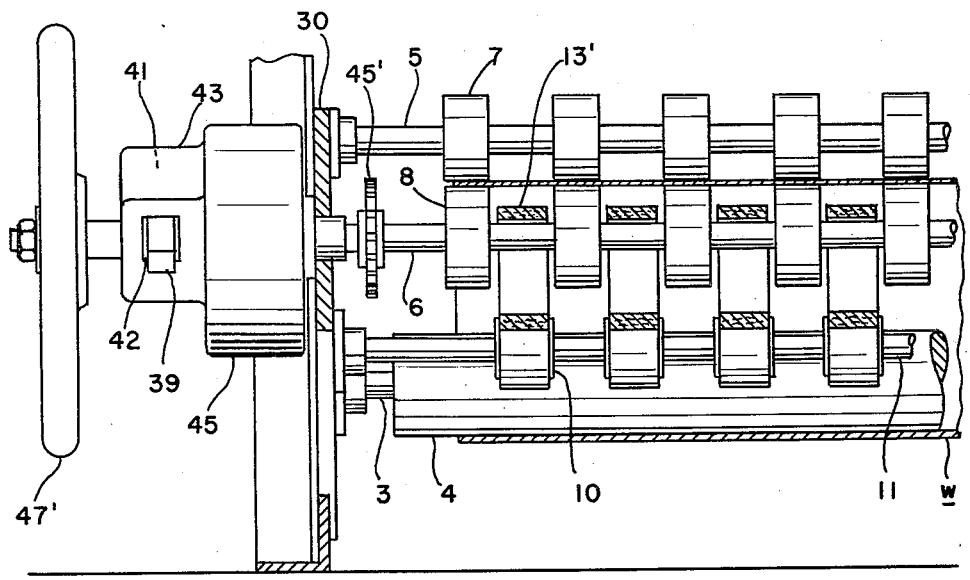
Figure 5:
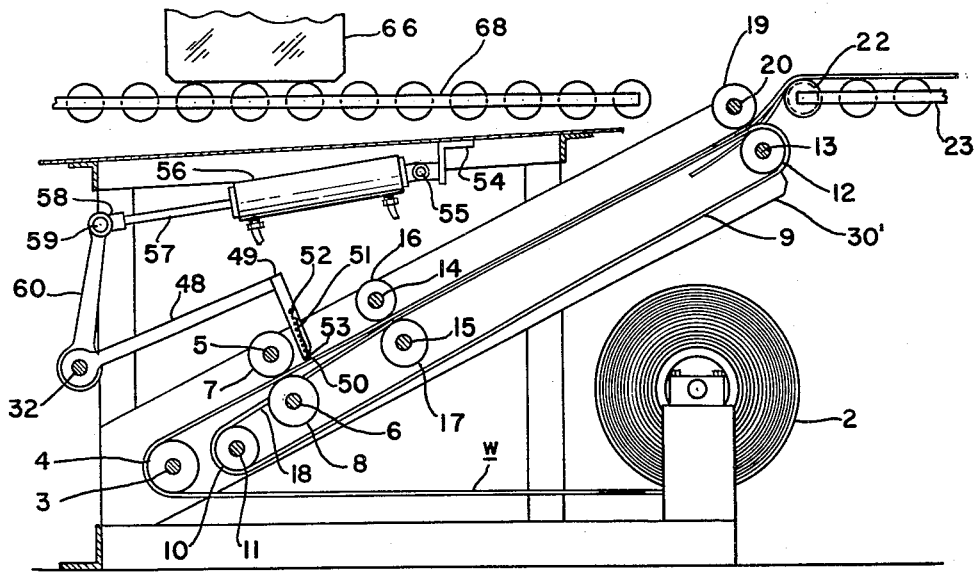

FIGS. 3 and 4 are fragmentary sectional views taken along lines 3—3 and 4—4, respectively, of FIG. 1; and FIG. 5 is a fragmentary sectional view taken along along line 5—5 of FIG. 3 and showing the cutting operation.

Referring now in more detail and by reference characters to the drawings, which illustrate a preferred embodiment of the present invention, A designates a cutting and delivering apparatus including a roll stand 1 for rotatably supporting a roll 2 of polyethylene or other similar plastic material from which a web w can be withdrawn. Operatively mounted on a shaft 3, in spaced relation to the roll stand 1, is an idler roll 4 around which the web w is trained, and similarly mounted in forwardly spaced relation to the idler shaft 3 are feed roll shafts 5, 6, which support co-operating feed rollers 7, 8, between which the web w passes. Positioned in forwardly spaced relation to the idler shaft 3 is an over-speed conveyor 9 provided at its lower end with rollers 10 supported on a shaft 11 and its upper end with rollers 12 mounted on a shaft 13, the rollers 12 being somewhat larger in diameter than the rollers 10. Trained around the rollers 10, 12, is a series of spaced endless conveyor belts 13'. Operatively mounted in forwardly and upwardly spaced relation to the shafts 5, 6, are shafts 14, 15, which support co-operating over-speed carry rolls 16, 17. The over-speed carry rolls 17 are of somewhat larger diameter than the rollers 10, and the belts 13' are trained thereover so as to provide a short run 18 which extends downwardly at an angle to the web w. Adjacent the roller 12 and co-operating therewith are delivery rollers 19 suitably supported on a shaft 20 and positioned somewhat between the rollers 12, 19, and extending forwardly and upwardly therefrom are guide fingers 21, the latter being provided with upper margins 21' which extend over the end roll 22 of the roll conveyor 23, and for purposes presently more fully appearing.

Positioned in rearwardly spaced relation to the roll stand 1 is a supporting frame 24 integrally including upstanding front posts 25, 26, and somewhat shorter upstanding rear posts 27, 28, and welded to the upper end of the posts 25, 26, 27, 28, is a cover plate 29. Also welded to the posts 25, 26, 27, 28, are spaced parallel side plates 30, 30', which journal the shafts 3, 5, 6, 13, 14, 15, 20, it being understood that such journals are well known in connection with such machinery and are, therefore, not described in detail. Mounted on the rear posts 27, 28, approximately midway of their lengths are spaced aligned bearings 31, 31', which journal a shaft 32 and rigidly secured to the shaft 32, adjacent the bearing 31, is a crank arm 33, the outer end of which slidably receives a collar 34, the latter being held in position by means of a lock bolt 35 having a manipulating knob 36 on its outer end. Projecting outwardly from the collar 34 is a pin 37 for rockably supporting one end 38 of a rack bar 39, the lower end of which is provided with gear teeth 40. The lower end of the rack bar 39 projects through aligned openings 41, 42, in a housing 43 which is rockably mounted on the shaft 6, and meshes with a pinion 44 rigidly mounted on the shaft 6 within the housing 43. Also mounted on the shaft 6 adjacent the housing 43 is an overrunning clutch 45 and a sprocket 45', the latter having a drive chain 46 trained therearound and operatively connected to a sprocket 47 mounted on the shaft 13. On its outer end, the shaft 6 is provided with a hand-wheel 47'. It will be apparent that the clutch 45 establishes a one-way driving connection between the pinion 44 and over-speed conveyor 9 so that upon rotation of the pinion 44 clockwise (reference being made to FIG. 1), the over-speed conveyor 9 will be driven and will, in turn, drive the over-speed carry rollers 16, 17.

Rigidly secured to the shaft 32 is a pair of spaced forwardly extending arms 48, 48', the forward ends of which are provided with secondary arms 49, 49', having a high resistance wire 50, preferably of Nichrome, extending therebetween. The secondary arm 49 is provided with a tension spring 51, one end of which is anchored at 52 to the secondary arm 49, the other end 53 being connected to one end of the resistance wire 50. Also connected to the opposite ends of the resistance wire are lead wires *l* by which the wire 50 can be connected to a suitable source of electric current (not shown). Upon heating of the wire 50, the slack due to expansion will be taken up by the spring 51.

Bolted or otherwise secured to the under side of the cover plate 29 is a depending bracket 54 provided with a pin 55 which rockably supports one end of an air cylinder 56 having an outwardly projecting piston rod 57, the outer end of which is integrally provided with a collar 58. Rockably secured by means of a pin 59 to the collar 58 is a downwardly extending crank arm 60, the lower end of which is rigidly secured to the shaft 32. At its opposite ends, the air cylinder 56 is provided with inlet and outlet conduits 61, 62, which are connected to a solenoid operated valve 63 mounted on the under side of the cover plate 29. The solenoid valve 63 is provided with an inlet conduit 64 which is connected to a suitable source of compressed air (not shown). Electrically connected to the solenoid operated valve 63 by means of lead wires *l'*, is a foot operated switch 65 positioned on the floor below the conveyor 23.

In use, the web *w* is withdrawn from the roll 2 and is trained around the idler roller 4 and, upon suitable rotation of the hand-wheel 47', is fed between the feed rolls 7, 8. The foot switch 65 is depressed actuating the solenoid valve 63 and causing the air to enter the cylinder 56 through the conduit 61 and move the piston rod 57 from the position shown in FIG. 1 to that shown in FIG. 5, whereupon the rack bar 39 and pinion 44 will drive the feed rollers 7, 8, the over-speed conveyor 9, and the over-speed carry rolls 16, 17, causing the web *w* to be gripped between the carry rolls 16, 17. Simultaneously, the arms 48, 48', and their associated secondary arms 49, 49', will swing downwardly to a position forwardly to the feed rollers 7, 8, and above the run 18 so that the heated resistance wire 50 will pass through and cut the web *w*. The carry rolls 16, 17, and the over-speed conveyor 9 are arranged so as to be driven much faster than the speed at which the feed rollers 7, 8, feed the web *w*. Consequently, the web *w* is tensioned but is still permitted to slip on the over-speed conveyor 9. After the web *w* is cut to form a sheet *s*, the momentum of the fast moving over-speed conveyor 9 will carry the sheet *s* forwardly of the carry rolls 16, 17. Upon repeating the cutting operation, the sheet *s* will be delivered between the rollers 12, 19, and onto the guide fingers 21 which will, in turn, guide the sheet *s* onto the conveyor 23. Thus, each time a sheet *s* is cut from the web *w*, the sheet *s* adjacent the rollers 12, 19, will be fed onto the conveyor 23. The clay blocks 66 which come out of a clay extruding machine 67 and pass along a roller conveyor 68 are then transferred to the conveyor 23 for subsequent wrapping in the sheet *s*. Upon release of the foot switch 65, air enters the air cylinder 56 through the conduit 62 and returns the piston rod 57 to its initial position, as shown in FIG. 1. Since the pinion 44 is drivingly connected to the feed rollers 8 through the over-running clutch 45, the reverse rotation of the pinion 44 during the return stroke of the piston rod 57 and rack bar 39 will not tend to back feed the web *w* or cause reverse movement of the over-speed conveyor 9. Should it be desired to change the length of the sheet *s* cut off from the web *w*, it is merely necessary to vary the length of stroke of the rack bar 39 by turning the knob 36 so as to loosen the collar 34 and thereafter slide the collar 34 upwardly or downwardly along the crank arm 33 and lock it in position.

It should be understood that changes and modifications in the form, construction, arrangement, and combination of the several parts of the sheet cutting and delivery units may be made and substituted for those herein shown and described without departing from the nature and principle of my invention.

Having thus described my invention, what I claim and desire to secure by Letters Patent is:

1. A sheet cutting and delivery unit comprising co-operating feed rollers for withdrawing a web of material from a source of supply, a conveyor having its intake end lower than its discharge end, the intake end being in alignment with the feed rollers, said conveyor extending upwardly and forwardly from the feed rollers, co-operating carry rollers operatively mounted along the conveyor in forwardly spaced relationship to the feed rollers, said carry rollers being constructed for gripping and tensioning the web between the feed rollers and the carry rollers as it is fed by said feed rollers so that the tensioned portion of the web between the feed rollers and the carry rollers is elevated above the lower end of the conveyor, a heated wire for transversely cutting said web after a predetermined length thereof has been fed through the feed rollers, means for conveying the sheet thus cut from the web, and intermittently actuable driving means including a unidirectional clutch having a driven member and a driving member, said driving member being connected through a pinion to a rack bar, said driven member being operatively connected to the feed rollers, and being adapted, during a single cycle of intermittent operation, to actuate the sheet feeding rollers through a selected amount of movement, whereby to propel the web from a stationary position forwardly for a predetermined distance so that a desired length thereof extends along the conveyor toward the carry rollers, whereby the web again becomes stationary.

2. A sheet cutting and delivery unit comprising co-operating feed rollers for withdrawing a web of material from a source of supply, a conveyor having its intake end lower than its discharge end, the intake end being in alignment with the feed rollers, said conveyor extending upwardly and forwardly from the feed rollers, co-operating carry rollers operatively mounted along the conveyor in forwardly spaced relationship to the feed rollers, said carry rollers being constructed for gripping and tensioning the web between the feed rollers and the carry rollers as it is fed by said feed rollers so that the tensioned portion of the web between the feed rollers and the carry rollers is elevated above the lower end of the conveyor, said carry rollers having a peripheral speed greater than that of said feed rollers, means for transversely cutting said web after a predetermined length thereof has been fed through the feed rollers, means traveling faster than said feed rollers for conveying the sheet thus cut from the web, and intermittently actuable driving means including a unidirectional clutch having a driven member and a driving member, said driving member being connected through a pinion to a rack bar, said driven member being operatively connected to the feed rollers, and being adapted, during a single cycle of intermittent operation, to actuate the sheet feeding rollers through a selected amount of movement, whereby to propel the web from a stationary position forwardly for a predetermined distance so that a desired length thereof extends along the conveyor toward the carry rollers, whereby the web again becomes stationary.

3. A sheet cutting and delivery unit comprising co-operating feed rollers for withdrawing a web of material from a source of supply, a conveyor having its intake end lower than its discharge end, the intake end being in alignment with the feed rollers, said conveyor extending upwardly and forwardly from the feed rollers, co-operating carry rollers operatively mounted along the conveyor in forwardly spaced relationship to the feed rollers, said carry rollers being constructed for gripping and tensioning the web between the feed rollers and the carry rollers as it is fed by said feed rollers so that the tensioned portion of the web between the feed rollers and the carry rollers is elevated above the lower end of the conveyor, said carry rollers having a peripheral speed greater than that of said feed rollers, means for transversely cutting said web after a predetermined length thereof has been fed through the feed rollers, intermittently actuable driving means including a unidirectional clutch having a driven member and a driving member, said driving member being connected through a pinion to a rack bar, said driven member being operatively connected to the feed rollers, and being adapted, during a single cycle of intermittent operation, to actuate the sheet feeding rollers through a selected amount of movement, whereby to propel the web from a stationary position forwardly for a predetermined distance so that a desired length thereof extends along the conveyor toward the carry rollers, whereby the web again becomes stationary.

4. A sheet cutting and delivery unit comprising co-operating feed rollers for withdrawing a web of material from a source of supply and propelling it in a forward direction, co-operating carry rollers operatively mounted in forwardly spaced relation to the feed rollers for gripping the web as it is fed by said feed rollers, said carry rollers having a peripheral speed greater than that of said feed rollers whereby to tension the portion of the web extending between the feed rollers and carry rollers, a heated wire extending transversely across said web in the region between the feed rollers and carry rollers, means for shifting the heated wire down into contact with and through the web after a predetermined length thereof has been fed through the feed rollers, a conveyor traveling faster than the speed of said web and adapted to receive the sheet thus cut from the web, said conveyor having a run extending beneath and located in downwardly spaced relation to the line along which the web is cut, and intermittently actuable driving means including a unidirectional clutch having a driven member and a driving member, said driving member being connected through a pinion to a rack bar, said driven member being operatively connected to the feed rollers, and being adapted, during a single cycle of intermittent operation, to actuate the sheet feeding rollers through a selected amount of movement, whereby to propel the web from a stationary position forwardly for a predetermined distance so that a desired length thereof extends along the conveyor toward the carry rollers, whereby the web again becomes stationary.

5. A sheet cutting and delivery unit comprising co-operating feed rollers for withdrawing a web of material from a source of supply and propelling it in a forward direction, co-operating carry rollers operatively mounted in forwardly spaced relation to the feed rollers for gripping the web as it is fed by said feed rollers, said carry rollers having a peripheral speed greater than that of said feed rollers whereby to tension the portion of the web extending between the feed rollers and carry rollers, a heated wire extending transversely across said web in the region between the feed rollers and carry rollers, means for shifting the heated wire down into contact with and through the web after a predetermined length thereof has been fed through the feed rollers, a conveyor traveling faster than the speed of said web and adapted to receive the sheet thus cut from the web, and intermittently actuable driving means including a unidirectional clutch having a driven member and a driving member, said driving member being connected through a pinion to a rack bar, said driven member being operatively connected to the feed rollers, and being adapted, during a single cycle of intermittent operation, to actuate the sheet feeding rollers through a selected amount of movement, whereby to propel the web from a stationary position forwardly for a predetermined distance so that a desired length thereof extends along the conveyor toward the carry rollers, whereby the web again becomes stationary.

6. A sheet cutting and delivery unit comprising co-operating feed rollers for withdrawing a web of material from a source of supply and propelling it in a forward direction, co-operating carry rollers operatively mounted in forwardly spaced relation to the feed rollers, for gripping the web as it is fed by said feed rollers, said carry rollers having a peripheral speed greater than that of said feed rollers whereby to tension the portion of the web extending between the feed rollers and carry rollers, a heated wire extending transversely across said web in the region between the feed rollers and carry rollers, means for shifting the heated wire down into contact with and through the web after a predetermined length thereof has been fed through the feed rollers, a conveyor traveling faster than the speed of said web and adapted to receive the sheeet thus cut from the web, a rack and pinion operatively connected to the feed rollers and heated wire, driving means operatively connecting said feed rollers to said conveyor and intermittently operable carry rollers, and means for driving said rack and pinion whereby to operate the feed rollers, carry rollers, conveyor, and cutting wire in timed relation, said last-named means being actuable to operate during a single cycle of intermittent operation to rotate the feed rollers a selected amount of movement for propelling the web a desired distance so that a desired length extends along the conveyor.

7. A sheet cutting and delivery unit comprising a frame having a shaft journaled thereon, co-operating feed rollers within said frame for withdrawing a web of material from a source of supply and propelling it in a forward direction, co-operating carry rollers operatively mounted in forwardly spaced relation to the feed rollers for gripping the web as it is fed by said feed rollers, said carry rollers having a peripheral speed greater than that of said feed rollers whereby to tension the portion of the web extending between the feed rollers and carry rollers, a plurality of arms rigidly mounted on said shaft, a cutting wire secured to said arms and extending transversely above said web in the region between the feed rollers and carry rollers, means for shifting the heated wire down into contact with and through the web after a predetermined length thereof has been fed through said feed rollers, a conveyor traveling faster than the speed of said web and adapted to receive the sheet thus cut from the web, a crank arm rigidly secured to said shaft, a rack bar rockably pinned to said crank arm, a pinion operatively connected to said feed rollers and adapted to mesh with said rack bar, and intermittently actuable means for rotating said shaft, whereby the rack and pinion will operate the feed rollers, carry rollers, conveyor, and arms in timed relation, said last-named means being actuable to operate during a single cycle of intermittent operation to rotate the feed rollers a selected amount of movement for propelling the web a desired distance so that a desired length extends along the conveyor.

8. A sheet cutting and delivery unit comprising a frame having a shaft journaled thereon, co-operating feed rollers within said frame for withdrawing a web of material from a source of supply and propelling it in a forward direction, co-operating carry rollers operatively mounted in forwardly spaced relation to the feed rollers for gripping the web as it is fed by said feed rollers, said carry rollers having a peripheral speed greater than that of said feed rollers whereby to tension the portion of the web extending between the feed rollers and carry rollers, a plurality of arms rigidly mounted on said shaft, a cutting wire secured to said arms and extending transversely above said web in the region between the feed rollers and carry rollers, means for shifting the heated wire down into contact with and through the web after a predetermined length thereof has been fed through said feed rollers, a conveyor traveling faster than the speed of said web and adapted to receive the sheet thus cut from the web, a crank arm rigidly secured to said shaft, a rack bar rockably pinned to said crank arm, a pinion operatively connected to said feed rollers and adapted to mesh with said rack bar, a second crank arm mounted on said shift, and intermittently actuable pneumatically operated means for moving said second crank arm, whereby the rack and pinion will operate the feed rollers, carry rollers, conveyor, and arms in timed relation, said last-named means being actuable to operate during a single cycle of intermittent operation to rotate the feed rollers a selected amount of movement for propelling the web a desired distance so that a desired length extends along the conveyor.

9. A sheet cutting and delivery machine comprising sheet delivery means, sheet feeding means operatively mounted rearwardly of and below the sheet delivery means, said sheet feeding means being adapted to grip a web of sheet material and propel it in a forward direction toward the sheet delivery means, sheet carrying means operatively mounted between the sheet feeding means and sheet delivery means along the path of travel of the web as it is propelled forwardly and being adapted to engage the web in such manner as to apply tension to the portion thereof which extends between the sheet feeding means and sheet carrying means, conveyor means operatively associated with and extending between the sheet delivery means and sheet carrying means, said conveyor means being spaced at its rear end from the sheet feeding means and, in the portion of its length between the sheet carrying means and the sheet delivery means, being located directly beneath the path of travel of the web so as to support the web, intermittently actuable driving means operatively connected to the sheet feeding means, and being adapted, during a single cycle of intermittent operation, to actuate the sheet feeding means through a selected amount of movement whereby to propel the web from a stationary position forwardly for a predetermined distance so that a desired length thereof extends upwardly along the conveyor means toward the sheet delivery means whereupon the web again becomes stationary, said conveyor means also being operatively connected to the driving means so as to move in the forward direction as the sheet feeding means moves and to continue such movement after the sheet feeding means has completed its selected amount of movement, the engagement between the conveyor means and the web being such that the conveyor means will slip freely beneath the forwardly propelled length of the web as the web becomes stationary, and web severing means operatively mounted between the sheet feeding means and the sheet carrying means and connected to the driving means for actuation responsive thereto in timed relation to the movement of the sheet feeding means in such manner as to engage the tensioned portion of the web and sever the forwardly extended length from the web as a discrete sheet which then is moved forwardly away from the stationary web by the continued movement of the conveyor means.

10. A sheet cutting and delivery machine comprising sheet delivery means, sheet feeding means operatively mounted rearwardly of and below the sheet delivery means, said sheet feeding means being adapted to grip a web of sheet material and propel it in a forward direction toward the sheet delivery means, sheet carrying means operatively mounted between the sheet feeding means and sheet delivery means along the path of travel of the web as it is propelled forwardly and being adapted to engage the web in such manner as to apply tension to the portion thereof which extends between the sheet feeding means and sheet carrying means, conveyor means operatively associated with and extending between the sheet delivery means and sheet carrying means, said conveyor means being spaced at its rear end from the sheet feeding means and, in the portion of its length between the sheet carrying means and the sheet delivery means, being located directly beneath the path of travel of the web so as to support the web, intermittently actuable driving means including a unidirectional clutch operatively connected to the sheet feeding means, and being adapted, during a single cycle of intermittent operation, to actuate the sheet feeding means through a selected amount of movement whereby to propel the web from a stationary position forwardly for a predetermined distance so that a desired length thereof extends upwardly along the conveyor means toward the sheet delivery means whereupon the web again becomes stationary, said conveyor means also being operatively connected to the driving means so as to move in the forward direction as the sheet feeding means moves and to continue such movement after the sheet feeding means has completed its selected amount of movement, the engagement between the conveyor means and the web being such that the conveyor means will slip freely beneath the forwardly propelled length of the web as the web becomes stationary, and web severing means operatively mounted between the sheet feeding means and the sheet carrying means and connected to the driving means for actuation responsive thereto in timed relation to the movement of the sheet feeding means in such manner as to engage the tensioned portion of the web and sever the forwardly extended length from the web as a discrete sheet which then is moved forwardly away from the stationary web by the continued movement of the conveyor means.

11. A sheet cutting and delivery machine comprising sheet delivery means, sheet feeding means operatively mounted rearwardly of and below the sheet delivery means, said sheet feeding means being adapted to grip a web of sheet material and propel it in a forward direction toward the sheet delivery means, sheet carrying means operatively mounted between the sheet feeding means and sheet delivery means along the path of travel of the web as it is propelled forwardly and being adapted to engage the web in such manner as to apply tension to the portion thereof which extends between the sheet feeding means and sheet carrying means, conveyor means operatively associated with and extending between the sheet delivery means and sheet carrying means, said conveyor means being spaced at its rear end from the sheet feeding means and, in the portion of its length between the sheet carrying means and the sheet delivery means, being located directly beneath the path of travel of the web so as to support the web, intermittently actuable driving means including a unidirectional clutch having a driven member and a driving member said member being connected through a pinion to a rack bar, said driven member being operatively connected to the sheet feeding means, and being adapted, during a single cycle of intermittent operation, to actuate the sheet feeding means through a selected amount of movement whereby to propel the web from a stationary position forwardly for a predetermined distance so that a desired length thereof extends upwardly along the conveyor means toward the sheet delivery means whereupon the web again becomes stationary, said conveyor means also being operatively connected to the driving means so as to move in the forward direction as the sheet feeding means moves and to continue such movement after the sheet feeding means has completed its selected amount of movement, the engagement between the conveyor means and the web being such that the conveyor means will slip freely beneath the forwardly propelled length of the web as the web becomes stationary, and web severing means operatively mounted between the sheet feeding means and the sheet carrying means and connected to the driving means for actuation responsive thereto in timed relation to the movement of the sheet feeding means in such manner as to engage the tensioned portion of the web and sever the forwardly extended length from the web as a discrete sheet which then is moved forwardly away from the stationary web by the continued movement of the conveyor means.

(References on following page)

References Cited in the file of this patent

UNITED STATES PATENTS

| | | |
|---|---|---|
| 497,566 | Clarke | May 16, 1893 |
| 828,546 | Hart | Aug. 14, 1906 |
| 1,433,672 | Bucklin | Oct. 31, 1922 |
| 1,462,138 | Langston | July 17, 1923 |
| 1,487,663 | Langston | Mar. 18, 1924 |
| 1,748,243 | Peterson | Feb. 25, 1930 |
| 1,802,968 | Everett et al. | Apr. 28, 1931 |
| 1,810,987 | Schmitt | June 23, 1931 |
| 1,847,767 | Koch | Mar. 1, 1932 |
| 1,946,375 | Wentjar | Feb. 6, 1934 |
| 2,042,829 | Carlin | June 2, 1936 |
| 2,045,046 | Mudd | June 23, 1936 |
| 2,242,645 | Frost | May 20, 1941 |
| 2,261,968 | Matthews | Nov. 11, 1941 |
| 2,538,191 | Davis | Jan. 16, 1951 |
| 2,672,196 | Gross et al. | Mar. 16, 1954 |
| 2,684,655 | Kuhnle | July 27, 1954 |
| 2,704,123 | Williams | Mar. 15, 1955 |
| 2,713,447 | Maner | July 19, 1955 |
| 2,868,289 | Winter | Jan. 13, 1959 |
| 2,948,177 | Arvidson | Aug. 9, 1960 |